United States Patent Office 2,880,260
Patented Mar. 31, 1959

2,880,260

STORAGE BATTERY SEPARATOR

Howard J. Strauss, Philadelphia, Pa., assignor to The Electric Storage Battery Company, a corporation of New Jersey Application May 7, 1956, Serial No. 583,041

1 Claim. (Cl. 136—143)

The invention relates to separators for use in storage batteries and, more particularly, for use in storage batteries of the alkaline type that are sealed against the passage of gases either to or from the interior of the battery.

In the operation of conventional open type alkaline batteries containing, for example, positive plates including an active material of a nickel oxide and negative plates including an active material of metallic cadmium, there are evolved as a result of the cycling of the battery certain gases such as oxygen and hydrogen. This gas evolution occurs especially during overcharge of the battery during which oxygen is evolved at the positive plate and hydrogen at the negative plate, and overdischarge i.e. reversal of the battery during which the gas evolution consists of hydrogen at the positive plate and oxygen at the negative plate. As a result of the evolution of such gases there occurs depletion of the alkaline electrolyte, consisting conventionally of a dilute aqueous solution of potassium hydroxide, which gives rise to problems of maintenance and replenishment. Additionally, in the case of alkaline batteries that are vented to the atmosphere, carbon dioxide in the air tends to react with the potassium hydroxide electrolyte thereby forming potassium carbonates which are harmful to the battery. Under these circumstances the electrolyte must be completely replaced and the cell cleansed of the potassium carbonate prior to further use thereof.

Accordingly, it has become desirable to completely seal the battery in order that no gases can escape from the interior thereof to the atmosphere and that no harmful reactions will occur as a result of the contact of the atmosphere with the alkaline electrolyte. Generally, in the past, the constructions proposed to enable the battery to be sealed have taken advantage of the fact that the gases evolved within the battery react with the active materials of the positive and negative plates thereby maintaining any build up of gas pressure within safe limits. Of the two gases evolved during operation of the battery, it is well known that oxygen will react much more readily with the materials available. For example, when the positive plate goes into overcharge whereby oxygen is evolved, this gas will combine readily with the active material, metallic cadmium, of the negative plate. Upon evolution of hydrogen at the negative plate, however, a reaction will only occur to a slight extent between such gas and the active material of the positive plate which is generally deemed to be a higher oxide of nickel, such as nickelic oxide, $Ni_2O_3$. A prime feature of previous sealed batteries has been, therefore, to so construct such batteries that they will operate on the oxygen cycle whereby hydrogen will never be evolved regardless of overcharge or reversal. This feature, consisting of positive plates having excess charged capacity and negative plates having excess uncharged capacity, this being the relative condition of the plates at the time the cell is sealed, is covered by U.S. patent application Ser. No. 543,051, filed by William W. Smith and Howard J. Strauss on October 27, 1955, now abandoned, and assigned to the assignee of the present application, such feature forming no part of the present invention.

As in the case of all chemical and electrochemical reactions a prime problem to be overcome has been to make the reactants immediately available to each other. In other words, in the conventional construction of sealed storage batteries with closely spaced plates and separators the gas evolved at the positive plate has difficulty in passing to the negative plate where it can be reduced at a rate commensurate with the rate of its evolution, and the counterbalancing speed of the reduction process is a prime necessity if overall gas pressure within the sealed battery is to be kept to a minimum.

It is, therefore, an object of the invention to provide a new and improved separator for insertion between alternate positive and negative plates which will permit the ready passage from one plate to the other of gas evolved at the former plate.

Whereas in conventional storage battery cells free electrolyte is present to insure optimum ionic transfer between the plates thereby keeping internal resistance to a minimum, it has heretofore been suggested that the separators for sealed alkaline batteries be of such a material as to completely absorb all electrolyte present within the battery thereby insuring that the path which the gas must traverse through the electrolyte will be as short as possible. It is recognized, however, that the diffusion rate of oxygen through air is in the order of many times that of the diffusion rate through the potassium hydroxide electrolyte. Accordingly, U.S. Patent No. 2,571,927—Neuman et al., has suggested a separator construction containing macroporous openings which will not be filled by electrolyte, the necessary amount of electrolyte for ionic conductivity being provided by a film or layer of said electrolyte retained on the solid portions of the separator as by surface tension.

As illustrative of the present invention, reference is now made to the drawings in which.

Figure 1:
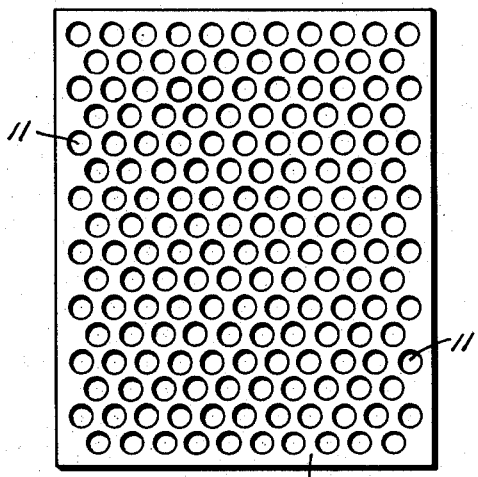
Figure 1 represents an elevational view of one embodiment of the invention.

Referring now to the drawing, in which like numerals are used to designate like features, 10 indicates generally a separator which is adapted for use between alternate positive and negative plates in a sealed nickel cadmium type storage battery. Separator 10 comprises basically a microporous sheet produced from material inert to the alkaline electrolyte which will be encountered in this type of storage battery and also highly resistant to oxidation. The separator will preferably have in addition a high degree of mechanical strength per unit of thickness. It has been found that microporous material produced in accordance with the methods disclosed in U.S. Patent No. 2,527,524, Honey et al., is eminently satisfactory for present purposes. It will be understood that although said patent refers to polyvinyl chloride, other materials of the same general group, i.e., thermoplastic resins, such as, for example, polyethylene, polystyrene, and polyvinylidene chloride are satisfactory for use in accordance with the present invention.

Figure 2:
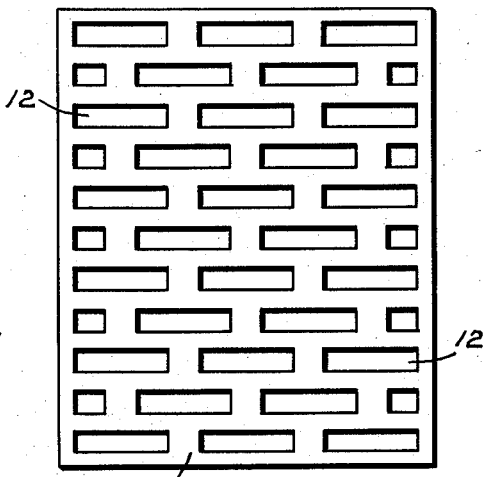
Figure 2 represents an elevational view of an optional form of the invention.
Figure 3:
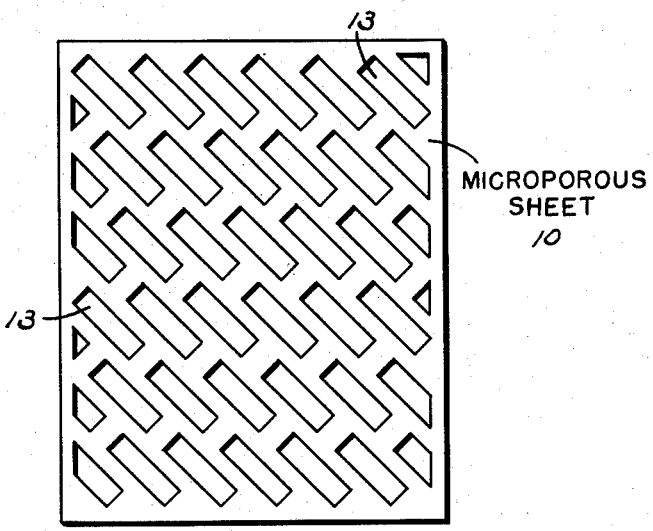
Figure 3 represents another elevational view of an optional form of the invention.

Whether produced by the process of said patent, or by other methods known to the art of imparting microporosity to thermoplastic materials, the sheet will preferably have a microporosity in the amount of from about 60% to about 85%. According to the invention such microporous sheet 10 is further provided with a plurality of perforations, designated as 11 in Figure 1 and 12 in Figure 2, and 13 in Figure 3. It will be noted that perforations 11 are shown as circular in shape whereas perforations 12 and 13 have the form of longitudinal slots. The actual shape of the perforations is immaterial to the present invention, the only criteria being that said perforations shall be macroscopic and shall be of a sufficient dimension that the electrolyte retained within the pores of separator 10 shall not completely fill the perforations throughout the thickness of the separator by reason of surface tension or otherwise. For this purpose a size of from about one-sixteenth of an inch to about one-quarter of an inch in diameter has been found to be suitable for perforations 11. Insofar as openings 12 and 13 are concerned, i.e., openings of a longitudinal form, the narrowest dimension, that is to say, the width of the slot, should be not less than about one-sixteenth of an inch nor more than about one-quarter of an inch. Regardless of the shape of perforations or openings that may be used they are preferably arranged in a vertically overlapping manner so that a gas bubble evolved at the lower portion of a plate and travelling upwardly along the surface of said plate will encounter at least one of said openings prior to emerging into the gas space at the top of the cell.

By utilizing a separator of the above described type, it will be understood that gas evolved at one plate can readily pass through the macroscopic openings such as shown at 11, 12 and 13 and contact the surface of the other plate. Due to the dimension openings 11 and 12 there will be a fine film of electrolyte covering the surface of each plate adjacent to the electrolyte free openings. Accordingly, while the macroscopic openings themselves are free of electrolyte thus affording a path that can readily be transversed by a gas bubble, the film of electrolyte covering the plate surface adjacent said openings insures that such portion of the plate will enter into all electrolytic reactions. Accordingly, if we assume the gas evolved to be oxygen which passes to the negative plate and there reduces metallic cadmium to cadmium oxide such portion of the plate will still be influenced by a charge current and will be recharged to metallic cadmium under the influence of said current. The remainder of separator 10 being highly microporous is saturated with electrolyte throughout its multiplicity of micropores and thereby provides a multiplicity of paths for ionic transfer.

It will thus be seen that I have provided by means of this invention a separator for use in sealed alkaline type storage batteries which will afford means whereby gas evolved at the positive plate can have ready access to the active material of the negative plate for reduction at that point.

The description and drawings are meant to be exemplary only of the invention and other forms and variations coming within the scope of the appended claim will occur to those skilled in the art.

I claim:

In a sealed storage battery of the alkaline type, including positive plates and negative plates, a separator interposed between adjacent plates, said separator consisting of a highly microporous thermoplastic resin having a plurality of macroscopic openings therethrough, the size of said macroscopic openings being from approximately one-sixteenth of an inch to about one-quarter of an inch in the narrowest dimension, said openings being arranged in a vertical overlapping manner so that gas passing upwardly between said plates will encounter at least one of said openings prior to reaching the top of said plates, and electrolyte absorbed within and saturating the microporous portions of said separator, the macroscopic openings being substantially free of electrolyte.

References Cited in the file of this patent

UNITED STATES PATENTS

| 2,542,527 | Honey et al. | Feb. 20, 1951 |
| 2,571,927 | Neumann et al. | Oct. 16, 1951 |
| 2,729,694 | Ellis | Jan. 3, 1956 |

FOREIGN PATENTS

| 725,076 | Great Britain | Mar. 2, 1955 |